April 7, 1942.    T. ZUSCHLAG    2,278,506
APPARATUS FOR GEOPHYSICAL PROSPECTING
Filed Oct. 4, 1939    2 Sheets-Sheet 1
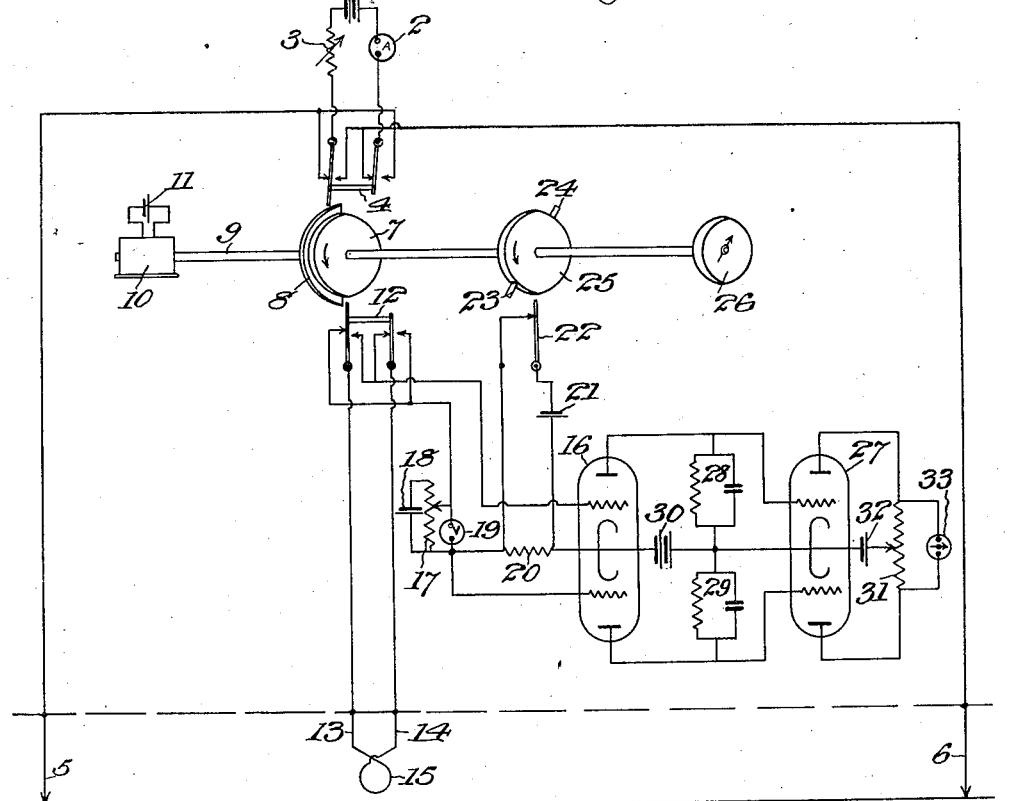
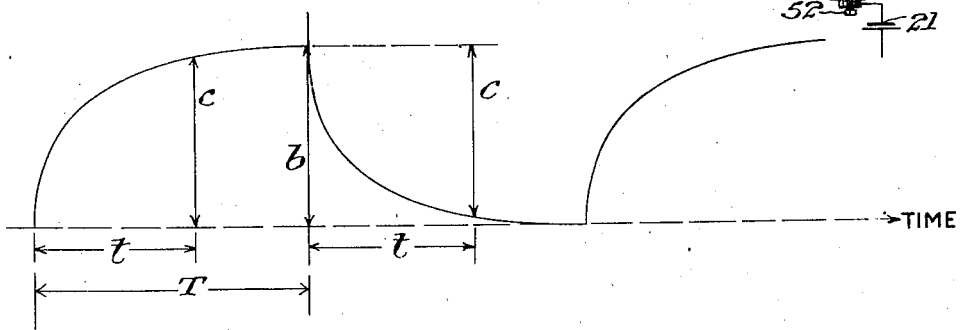
INVENTOR
Theodr Zuschlag
BY
his ATTORNEYS April 7, 1942.                T. ZUSCHLAG                2,278,506
              APPARATUS FOR GEOPHYSICAL PROSPECTING
                    Filed Oct. 4, 1939        2 Sheets-Sheet 2
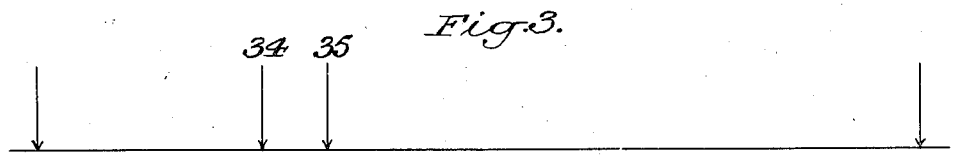
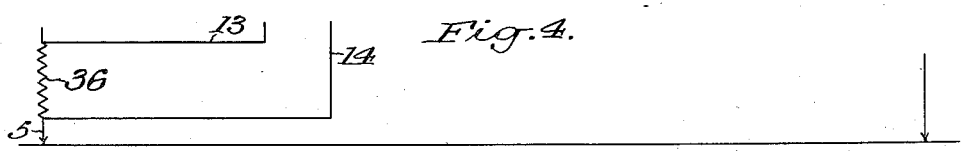
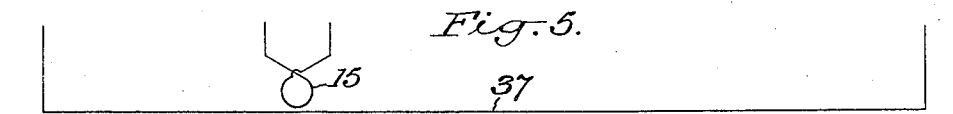
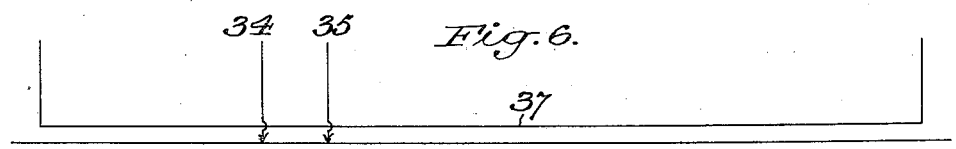
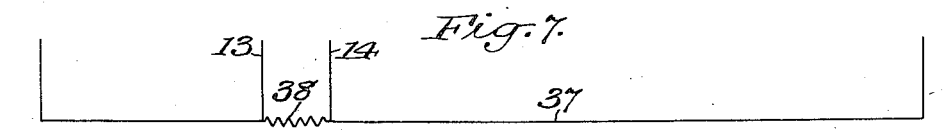
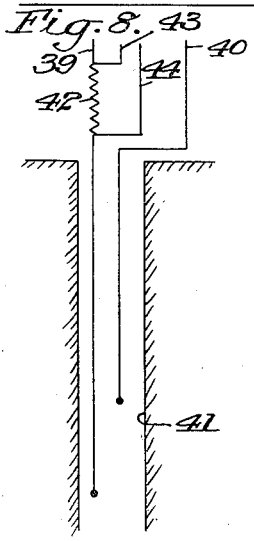
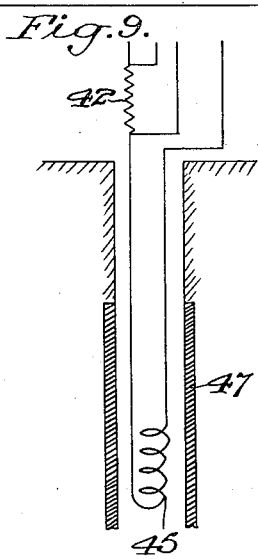
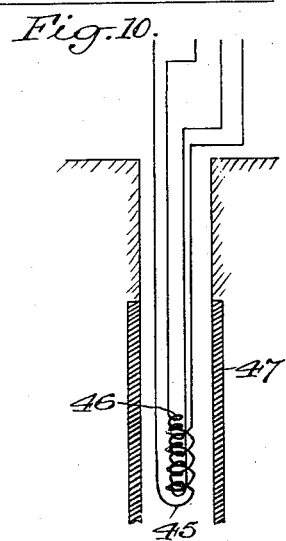
INVENTOR
Theodor Zuschlag
BY
his ATTORNEYS Patented Apr. 7, 1942

2,278,506

UNITED STATES PATENT OFFICE 2,278,506

APPARATUS FOR GEOPHYSICAL PROSPECTING

Theodor Zuschlag, West Englewood, N. J., assignor, by mesne assignments, to Lundberg Exploration S. A., Panama City, Panama, a corporation of Panama Application October 4, 1939, Serial No. 297,828

9 Claims. (Cl. 175—182)

This invention relates to apparatus for geophysical prospecting and, more particularly, to the analysis of electrical ground transients in various fields of geophysical exploration or prospecting, including electrical coring or drilling.

It is well known to those skilled in this art that valuable geological information may be gained by procedure which involves systematically subjecting a selected ground area that is being investigated to an analysis through the use of electrical ground currents. Such analyses, when correctly interpreted, frequently reveal geological facts that probably could not have been obtained by other means or procedure, so that there is a consequent desire to project or extend such analyses to a great depth, and this leads to a preferred use of direct current because the depth penetration of alternating current decreases as the frequency of the applied alternating current increases.

The methods generally employed for this last named purpose are based upon the observation of stationary or semi-stationary phenomena and involve variations in spacing of the energizing and pickup means in use so as to provide for selective results; but experience has shown that such procedures do not always yield results that can easily be interpreted nor provide the desired high degree of selectivity particularly with respect to specific depth and extension investigations. To improve the conditions just named, as well as to increase the efficiency of such prospecting methods as a whole, it has been proposed to introduce into these investigations a factor additional to the variation in spacing above named, which factor comprises the use of transient phenomena introduced by the sudden application of electric current to appropriate ground energizing means. The inrushes of current generated by such sudden applications into a ground network generally involve the creation of electrical transients which, in the case of geophysical prospecting, are largely determined by and dependently related to the electric constants of the ground area subjected to and energized by the sudden application of electric current and consequent release of electric energy; although, of course, there are, in this connection, additional conditions that may affect the result.

Several methods of and apparatus for utilizing such transient phenomena for practical geophysical investigation have previously been suggested, but most of them employ a fast cathode ray oscillograph for recording purposes, which oscillograph is energized by a single electrical charge of the ground area under investigation. It has been demonstrated, however, that present type cathode ray oscillographs are not very convenient or well suited to geophysical field work, and also that the single charge energization of the oscillograph is not well calculated to insure, or even permit, the maximum amount of sensitivity and consequent accuracy of investigation information.

The present invention has for an object to overcome the drawbacks above named, and others inherent in this type of exploration, chiefly by eliminating the use of an inconvenient and cumbersome type of recording or measuring instrument; and also by substituting a recurring type of electrical energization for the single charge type to which reference has been made.

Another object of the present invention is to bring forth an apparatus for the analysis of electrical ground transients which utilizes a meter type indicator and a recurring type of direct current energization therefor.

Another object of the present invention is to provide an apparatus for such analysis which may be used, without any changes, for electric coring or drill hole exploration even when such holes are partially or completely lined or encased by steel tubes or the like.

A further object of the present invention consists in providing certain improvements in the form, construction, elements and arrangement of the apparatus and in the steps of the method whereby the above named and other objects may effectively be attained.

Practical embodiments of the invention are diagrammatically represented in the accompanying drawings, in which Fig. 1 represents a wiring diagram of the apparatus;

Fig. 2 represents a possible configuration of a sequence of electric ground current reversals that may be generated in prospecting according to this invention;

Fig. 3 represents a modified arrangement of pickup means that may be used in carrying out the method;

Fig. 4 represents a second modified arrangement of the same;

Fig. 5 represents a modified form of energization means using the pickup arrangement shown in Fig. 1;

Fig. 6 represents a modified form of energization means using the pickup arrangement shown in Fig. 3;

Fig. 7 represents a further modified form of such means;

Fig. 8 represents an arrangement of the said means suitable for the investigation of drill holes;

Fig. 9 represents a modified form of the means shown in Fig. 8;

Fig. 10 represents a second modified form of such means; and

Fig. 11 represents a side elevation of the adjustable mounting of the bias timing switch.

Referring to the form of apparatus shown in Fig. 1, a suitable source of direct electric current denoted by 1 is connected in series with an ammeter 2, an adjustable current limiting resistance 3 and, through a reversing switch 4, to two energizing electrodes 5, 6 which are located and suitably spaced within the ground area that is under investigation.

A reversing switch 4 is intermittently operated by a continuously rotating disc 7, which has a peripheral cam 8 for directly engaging the switch and is fixed on a shaft 9 that is driven in the direction of the arrow on the disc, by a motor 10 energized from a suitable source of electricity such as battery 11. The cam 8 also intermittently operates another reversing switch 12 which connects the leads 13, 14 of a pickup loop 15 to the upper grid of a twin triode tube 16, and also to the slider of potentiometer 17 that is wired to battery 18. A voltmeter 19 is inserted between the lower end of potentiometer 17 and its slider in order to provide for reading the voltage across the lower half of the potentiometer; and the lower end of the said potentiometer is also connected to the lower grid of tube 16 as well as, in series with the fixed resistance 20, to the cathode of the said tube. The ends of resistance 20 are connected to the bias battery 21 in series with an adjustable bias timing switch 22; and the negative bias intermittently applied to both grids of tube 16 is of such high value that it cuts off the current flow in the plates of the tube. The operation of the bias switch 22 is controlled by means of pins 23, 24 that are mounted in the edge of disc 25 which is fixed to shaft 9 and rotates therewith, as indicated by the arrow thereon. The switch 22 is adjustable with respect to the pins 23, 24, as is shown in Fig. 11, and will be hereinafter described. The rotation of shaft 9 is intended to be at a uniform speed which may be measured and recorded by means of a tachometer 26.

The plates of the tube 16 are directly connected to the grids of the twin triode tube 27 and, in series with the identical condenser-resistance combinations 28, 29, to the positive pole of plate battery 30, which latter is also connected to the cathode of tube 27. The plates of tube 27 are connected to the ends of the balancing potentiometer 31, the slider of which is connected to the positive pole of plate battery 32 which has its negative pole connected to the cathode of tube 27. The layout is completed by shunting potentiometer 31 to galvanometer 33.

The method followed when using the above described apparatus in geophysical investigations as previously mentioned will now be explained. The ground area between electrodes 5 and 6 is energized by means of a direct current flow from source 1. The direction of this current flow is intermittently reversed by means of the motor-operated switch 4, and the current thus suddenly applied to the electrodes requires a short period of time to attain its full power or value.

In Fig. 2 there is represented the shape or configuration of such a possible current build-up which may be explained by assuming the generation of an original current value represented by $b$. The reversal of switch 4 changes the current flow through electrodes 5 and 6 at first very rapidly and then more slowly until there is reached a final value which is equal to $b$ but opposed thereto in polarity. Several factors determine the ultimate configuration of this current variation, most important of which are the opposing effect of the induced electromagnetic force set up by the sudden inrush of current, and the opposing effect of the eddy currents created in the surrounding conductive media which results in a considerable reduction of the speed of propagation of the electric and magnetic fields that are responsible for the transient phenomena.

It is believed that the speed of propagation of magnetic fields in conductive media, instead of approaching the speed of light, may be as slow as about ten feet per second for a field of sixty cycles passing through a copper conductor. The steep portion of the diagrammatically represented current wave generally is determined by the electric constants of media located in the immediate vicinity of the affected circuit; or, in other words, by surface effects. As a certain amount of time is required for the electric and magnetic fields to penetrate to a greater depth in the ground, it is clear that an investigation or analysis of the current changes taking place immediately after each current reversal will not give much information touching conditions at a greater depth. In order to obtain this last named information it is, therefore, preferable to eliminate the first steep portion of the current wave (unless it is definitely desired to investigate surface effects) and concentrate upon an analysis of the more slowly rising part of the current wave. The present invention especially provides for this last named procedure and makes possible a detailed analysis of any part or portion of the waves resulting from the above described application of current flow.

Referring again to Fig. 2 of the drawings, it may be noted that if $T$ represents the time required for a complete current reversal, the problem calls for the accurate determination of the current wave amplitude $c$ occurring at the time $t$. To solve this problem correctly, it is necessary that the two time values $T$ and $t$, as well as the final current value $b$, remain constant without variation during the successive current reversals.

On re-examining Fig. 1 of the drawings, it will be seen that the leads 13, 14 of pickup loop 15 are reversed in synchronism with the primary current changes by means of switch 12. Tube 16 is made non-conductive during most of the recurring current reversals, that is, except for a very short moment when pin 23 or pin 24 opens switch 22, during which moment the bias battery 21 is cut out so as to permit the flow of plate current through both halves of tube 16. Now, assuming first that no potential exists between the cathode and the upper grid of tube 16, the plate currents through both halves of said tube should be identical and result in an equal charge of condenser combinations 28, 29. This charge, of course, takes place only while switch 22 is open because, as soon as the said switch closes, the tube 16 is rendered non-conductive, and this means that the charge given the condenser combinations 28, 29 can leak off only through their respective shunt resistances and not through the tube 16. The condenser charges thus produced cause corresponding potential values to act upon the grids of tube 27, which results in plate current changes through the two halves of potentiometer 31. Normally the said plate current changes should be identical and not cause any deflection of the needle of galvanometer 33, but, if for some reason they should differ, equalization may readily be accomplished by suitable adjustment of the slider of potentiometer 31, which condition of equalization is denoted by zero reading of the galvanometer.

If it next be assumed that the potential between the cathode and upper grid of tube 16 is not zero but possesses a positive or negative value, then it is plain that the plate current flow through the upper section of tube 16 will be different from the plate current flow through its lower section, which will result in an unequal charge of the condenser combinations 28, 29, and a corresponding deflection of the needle of galvanometer 33. This deflection may be reduced to zero by adjusting the slider of potentiometer 17 until the potential acting between the leads 13, 14 is completely neutralized as will be indicated by the zero balance of the galvanometer. In this condition the voltage shown on meter 19 is a measure of the potential developed by the pickup loop 15 during the moment of the opening of switch 22. By proceeding in this manner and systematically shifting the position of switch 22 relative to the positions of pins 23, 24 on disc 25, it is possible to measure and plot the complete wave form, point by point for time values as short as one ten-thousandth of a second within current reversing cycles lasting from one one-hundredth of a second to one second.

The adjustable mounting of switch 22 is represented in Fig. 11, and it will be seen that the switch is pivoted at 48 to a clip 49 that is slidably mounted on a semi-circular track 50 which has its ends fastened by screws 51, 51 to a suitable support, not shown. The track is calibrated in any preferred scale, and a set screw 52 is threaded in clip 49 so as to secure the latter in any desired adjustment.

The original energizing arrangement illustrated in Fig. 1 may be modified or replaced by other suitable combinations without the necessity of further changes either in the apparatus itself or in the method followed in the use thereof. One such modification is represented in Fig. 3 of the drawings in which pickup loop 15 shown in Fig. 1 is eliminated and two pickup electrodes 34, 35 are substituted therefor.

Another modification appears in Fig. 4 of the drawings in which the leads 13, 14, instead of being connected to the pickup loop 15, are connected to a fixed resistance 36 that is itself connected in series with the electrode 5.

In the modification represented in Fig. 5, the electrodes 5 and 6 are replaced by a closed return lead 37 which acts in conjunction with the pickup loop 15.

In Fig. 6, the closed return lead 37 is combined with the two pickup electrodes 34, 35.

The modification illustrated in Fig. 7 uses the closed return lead 37 with a fixed resistance 38 that is similar to resistance 36 and is connected to the leads 13, 14.

All the various arrangements hereinabove described may be set up in the ground area under investigation and utilized for an analysis of the resultant electrical ground transients. Several procedures may be followed in order to obtain the desired information from such analyses or investigations. In some instances the operator may prefer to carry through a complete analysis of the ground transient using one of the above described setups or arrangements of apparatus, and then repeat the procedure with the use of another setup or arrangement. On the other hand, instead of making a complete analysis with one setup, the operator may regard it as desirable or satisfactory to determine the ground transients for fixed time values only with one setup, repeat this determination with another setup, and systematically continue such repeating procedure until the ground area under observation has been completely covered. Other modifications in carrying out the method and arranging the apparatus constituting the subject matter of this invention may be adopted by one skilled in the art and, in the case of any selected procedure, the results of the measurements may be diagrammatically plotted and interpreted as to their geological meaning in any suitable manner, several of which are well within the knowledge of those skilled in this art.

This invention is also well adapted to the investigation of drill holes, which is commonly known as electric coring, whether or not the holes be lined with metal, such as steel. Arrangements for conducting this procedure are indicated in Figs. 8, 9 and 10.

With reference to Fig. 8, two energizing and pickup electrodes 39, 40 are located in the drill hole 41 which is to be explored. A fixed resistance 42 is connected in series with the electrode 39 and is also connected to pickup leads 43, 44, that are similar to the leads 13, 14. In operation, the electrodes 39, 40 are systematically lowered or raised and electrical transient readings are made by use of the apparatus shown in Fig. 1, as previously described. In this connection, it is preferable to restrict the transient analysis to a few time value determinations which may be recorded automatically by the use of continuous recording devices well known in the art, such, for instance, as recording potentiometers of the micromax or similar type.

Arrangements for using inductive energization are illustrated in Figs. 9 and 10 of the drawings for electric coring purposes. In Fig. 9, a primary coil 45 is connected in series with the fixed resistance 42; and in Fig. 10 a separate secondary coil 46 is added to the primary coil 45 while the fixed resistance 42 is omitted. These arrangements illustrated in Figs. 9 and 10 are particularly effective in connection with the exploration of drill holes that are lined or encased with steel tubing 47 or the like. The inductive energization enables the building up of powerful magnetic fields which are capable of penetrating such steel tubes or casings even though they have heavy walls, and thereafter acting within the conductive material of the ground formations which surround the drill hole.

Variations in duration of reversals of current as well as in bias timing may be required when using the apparatus for different types of investigation and, in order to obtain maximum sensitivity, the values of the condenser-resistance combinations 28, 29, should be adjusted for these different durations. Surface explorations in general, for instance, call for short periods of reversals and even shorter timing intervals; while electric coring in encased drill holes may necessitate reversals lasting as long as a second or more. In order to comply with these varying conditions or requirements, as well as others that may be encountered in field work, the motor 10 may, if desired, be provided with any approved form of gear reduction or speed control unit.

It will be evident that the apparatus and method hereinabove set forth provide for the obtaining of accurate results in a broad field of use including depth investigations, without the disadvantage of cumbersome instruments or apparatus parts and inconvenient steps in method that have heretofore been regarded as necessary.

I desire it to be understood that various changes may be resorted to in the form, construction, material and arrangement of the several parts of the apparatus and in the steps of the method without departing from the spirit and scope of my invention; and hence I do not intend to be limited to the details herein shown and described, except as they may be included in the claims.

What I claim is:

1. Apparatus for detailed analysis of electrical ground transients comprising, a source of direct electric current flow, means for intermittently reversing said flow, pickup means, means for reversing the output of the pickup means, an indicating device which is normally non-conductive, periodically operating timing means for rendering said device conductive for short and pre-selected time periods during the current flow, means to balance said indicating device, and means for reading the time and amplitude constants of the measured ground transients.

2. Apparatus for detailed analysis of electrical ground transients comprising, a source of reversible direct electric current flow, means for causing said flow to recur, pickup means, means for reversing the output of the pickup means, a vacuum tube indicating device connected with said pickup means which is normally non-conductive, means for rendering said device conductive for short time periods during the current flow, means to balance said indicating device, and indicating means for determining the time and amplitude constants of the investigated ground transients.

3. Apparatus for detailed analysis of electrical ground transients comprising, a source of reversible direct electric current flow, means for causing said flow to recur, pickup means, means for reversing the output of the pickup means, an indicating device connected with said pickup means which is normally non-conductive, means for rendering said device conductive for short time periods during the current flow, means for continuously operating the means that causes the current flow to recur and the means for rendering the indicating device conductive, indicating means to balance said indicating device, and means for determining the time and amplitude constants of the investigated ground transients.

4. Apparatus for detailed analysis of electrical ground transients comprising, a source of reversible direct electric current flow, a synchronously operating switch for causing said flow to recur, pickup means, means for reversing the output of the pickup means, an indicating device connected with said pickup means which is normally non-conductive, a periodically operating timing switch for rendering said device conductive for short time periods during the current flow, means to balance said indicating device, and indicating means for determining the time and amplitude constants of the investigated ground transients.

5. Apparatus for detailed analysis of electrical ground transients comprising, a source of reversible direct electric current flow, a synchronously operating switch for intermittently reversing said flow, pickup means, means for reversing the output of the pickup means, an indicating device connected with said pickup means which is normally non-conductive, a periodically operating timing switch for rendering said device conductive for short time periods during the current flow, means to balance said indicating device, and indicating means for determining the time and amplitude constants of the investigated ground transients.

6. Apparatus for detailed analyses of electrical ground transients comprising, a source of reversible direct electric current flow, a synchronously operating switch for causing said flow to recur, pickup means, means for reversing the output of the pickup means, an indicating device connected with said pickup means which is normally non-conductive, a periodically operating timing switch for rendering said device conductive for short and pre-selected time periods during the current flow, means to balance said indicating device, and indicating means for determining the time and amplitude constants of the investigated ground transients.

7. Apparatus for detailed analysis of electrical ground transients comprising, a source of reversible direct electric current flow, a synchronously operating switch for intermittently reversing said flow, pickup means, means for reversing the output of the pickup means, an indicating device connected with said pickup means which is normally non-conductive, a periodically operating timing switch for rendering said device conductive for short and pre-selected time periods during the current flow, means to balance said indicating device, and indicating means for determining the time and amplitude constants of the investigated ground transients.

8. Apparatus for detailed analysis of electrical ground transients comprising, a source of reversible direct electric current flow, a synchronously operating switch for causing said flow to recur, pickup means, means for reversing the output of the pickup means, a vacuum tube indicating device connected with said pickup means which is normally non-conductive, a periodically operating time switch for rendering said device conductive for short time periods during the current flow, means to balance said indicating device, and indicating means for determining the time and amplitude constants of the investigated ground transients.

9. Apparatus for detailed analysis of electrical ground transients comprising, a source of reversible direct electric current flow, a synchronously operating switch for causing said flow to recur, pickup means, means for reversing the output of the pickup means, an indicating device connected with said pickup means which is normally non-conductive, a periodically operating timing switch for rendering said device conductive for short time periods during the current flow, means for continuously operating said switches, means to balance said indicating device, and indicating means for determining the time and amplitude constants of the investigated ground transients.

THEODOR ZUSCHLAG.

CERTIFICATE OF CORRECTION.

Patent No. 2,278,506. April 7, 1942.

THEODOR ZUSCHLAG.

It is hereby certified that error appears in the printed specification of the above numbered patent requiring correction as follows: Page 4, first column, lines 54, 55 and 56, for "indicating means to balance said indicating device, and means" read --means to balance said indicating device, and indicating means--; and second column, line 15, claim 6, for "analyses" read --analysis--; and line 51, claim 8, for "time switch" read --timing switch--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.